S. L. GATES.
Horse Hay Fork.
No. 44,087.   Patented Sept. 6, 1864.
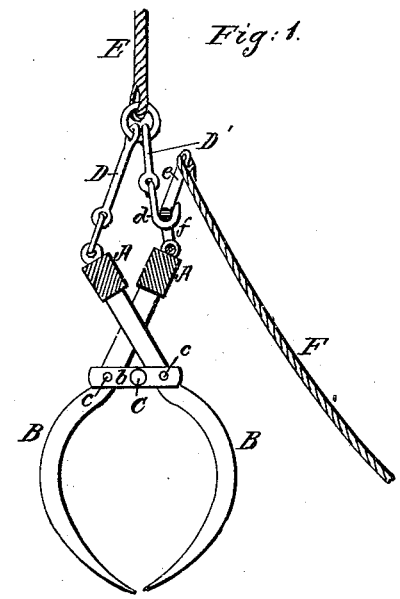
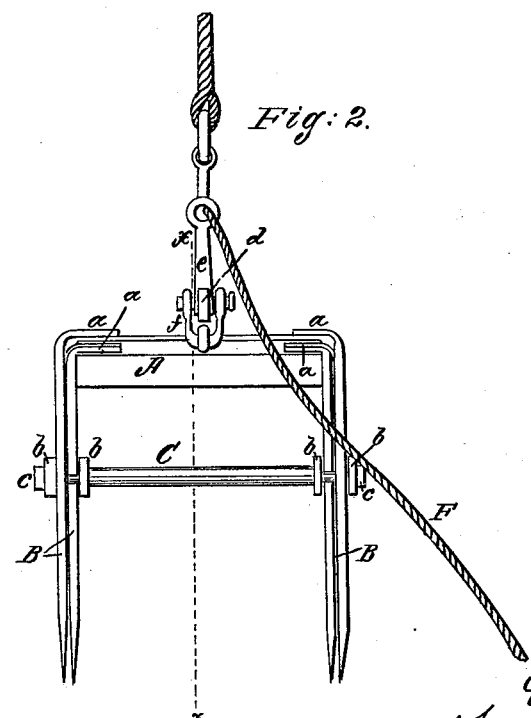
Witnesses:
C. L. Topleff
Henry Morris
Inventor:
Silas L. Gates
per Munn
Attorneys.

UNITED STATES PATENT OFFICE.

SILAS L. GATES, OF VERONA, NEW YORK.

IMPROVEMENT IN HORSE HAY-FORKS.

Specification forming part of Letters Patent No. 44,087, dated September 6, 1864.

*To all whom it may concern:*

Be it known that I, SILAS L. GATES, of Verona, in the county of Oneida and State of New York, have invented a new and Improved Horse Hay-Fork; and I do hereby declare that the following is a full, clear, and exact description thereof, which will enable others skilled in the art to make and use the same, reference being had to the accompanying drawings, forming part of this specification, in which—

Figure 1 is a vertical section of my invention, taken in the line $xx$, Fig. 2; Fig. 2, a side view of the same.

Similar letters of reference indicate like parts.

This invention consists in connecting two pairs of tines by means of a rod or shaft and straps, and having the cross-heads of said forks connected by chains or links with the hoisting-rope, one of said chains being connected with the cross-head of the tines by means of a hook and lever, all arranged in such a manner that the fork may be readily loaded with hay, and when elevated over the desired spot made to discharge its contents with the greatest facility.

A A represent two parallel bars or cross-heads, each having a tine, B, securely attached to its ends by bolts $a$. These tines B are curved at their lower parts, as shown in Fig. 1, and the tines of each bar A have their concave edges facing each other, and they are connected together just above the curved parts by two metal straps or plates, $b\ b$, one being at their outer and the other at their inner sides, with bolts $c$ passing through them and the tines. The two straps or plates $b\ b$ of the two tines at each end of the bars A A are connected by a rod, C.

D D′ represent two links, one of which, D, is connected at one end to the center of one of the bars A, and is attached at the opposite end to the hoisting-rope E. The upper end of the other link, D′, is also attached to the hoisting-rope E, and has a hook, $d$, at its lower end, which catches under a lever, $e$, fitted in an eye, $f$, attached to the center of the other bar A. The lever $e$ has a rope, F, attached to its end.

From the above description it will be seen that when the fork is being elevated and the hook $d$ under the lever $e$ the pull of the rope E will keep the lower parts of the two pairs of tines B toward each other and cause them to retain their load. When the fork is elevated over the desired spot the attendant pulls the rope F of lever $e$, and thereby draws down the outer end of the latter and forces the hook $d$ out from the eye $f$, which releases the bar A, to which said eye is attached, and the two pairs of tines are at once spread apart and the load discharged from the fork. When the empty fork is lowered the operator spreads apart the two pairs of tines and presses one foot on the rod C, which forces the tines into the hay. The hook $d$ is then inserted in the eye $f$ underneath the lever $e$. Then under the pull of the rope E the two pairs of tines will grasp the hay and the loaded fork be elevated as before.

By having the two pairs of tines connected by the straps or plates, as shown, the former are allowed a certain degree of play or movement longitudinally, so as to admit of the ready release of the hook $d$ from the eye $f$, and also of a more ready spreading of the tines.

I claim as new and desire to secure by Letters Patent—

The two pairs of tines B, attached to the bars A, and connected together by the straps or plates $b$ and rod C, and secured to the hoisting-rope E by means of the links D D′, hook $d$, lever $e$, and eye $f$, or their equivalents, substantially as and for the purpose specified.

SILAS L. GATES.

Witnesses:
S. WM. GATES,
JOHN BOWERS.